US012093758B2

United States Patent
Lees et al.

(10) Patent No.: US 12,093,758 B2
(45) Date of Patent: Sep. 17, 2024

(54) MIDDLEWARE IN WEB FRAMEWORK

(71) Applicant: International Business Machines Corporation, Armonk, NY (US)

(72) Inventors: Andrew Michael Lees, Ferndown (GB); David Richard Jones, Eastleigh (GB); Christopher Neil Bailey, Southampton (GB); Ian Partridge, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/295,860

(22) Filed: Mar. 7, 2019

(65) Prior Publication Data

US 2020/0285530 A1   Sep. 10, 2020

(51) Int. Cl.
*G06F 9/54* (2006.01)
(52) U.S. Cl.
CPC .................................. *G06F 9/548* (2013.01)
(58) Field of Classification Search
None
See application file for complete search history.

(56) References Cited

U.S. PATENT DOCUMENTS

| | | | |
|---|---|---|---|
| 7,673,285 B1 | 3/2010 | Michel et al. | |
| 8,291,437 B2 * | 10/2012 | Gathman | G06F 9/465 |
| | | | 709/208 |
| 2001/0007984 A1 * | 7/2001 | Fattah | G06F 9/547 |
| 2003/0229665 A1 * | 12/2003 | Ryman | H04L 67/24 |
| | | | 709/203 |
| 2005/0223104 A1 * | 10/2005 | Pessi | H04L 9/40 |
| | | | 709/230 |
| 2005/0229186 A1 * | 10/2005 | Mitchell | G06F 9/541 |
| | | | 719/315 |
| 2005/0251579 A1 * | 11/2005 | Ngo | G07C 5/008 |
| | | | 709/234 |
| 2007/0192405 A1 * | 8/2007 | Black | G06F 9/548 |
| | | | 709/203 |
| 2011/0126218 A1 * | 5/2011 | Kishita | G06F 9/545 |
| | | | 719/321 |

(Continued)

FOREIGN PATENT DOCUMENTS

EP   2023243 A1 *   2/2009   ........... G06F 9/5038

OTHER PUBLICATIONS

Hosek et al., "SAFEWEB: A Middleware for Securing Ruby-based Web Applications," Middleware '11: Proceedings of the 12th International Middleware Conference, 2011, 21 pages.

(Continued)

*Primary Examiner* — Chat C Do
*Assistant Examiner* — William C Wood
(74) *Attorney, Agent, or Firm* — Nathan M. Rau; David K. Mattheis

(57) ABSTRACT

Concepts for middleware in a web framework are presented. One example comprises defining a target object type configured to hold results of a middleware function. A first object for an application is received and a process of the middleware function is performed, using the first object, to generate a process result. Based on the process result, a second object of the target object type is generated, after which the second object is provided to the application.

12 Claims, 4 Drawing Sheets

(56) References Cited

U.S. PATENT DOCUMENTS

| | | | |
|---|---|---|---|
| 2011/0247012 A1* | 10/2011 | Uehara | G06F 9/546 |
| | | | 719/318 |
| 2012/0197963 A1* | 8/2012 | Bouw | G06F 16/258 |
| | | | 709/202 |
| 2016/0234337 A1* | 8/2016 | Wilcox | H04L 67/61 |
| 2017/0249130 A1 | 8/2017 | Smiljanic et al. | |
| 2018/0176278 A1 | 6/2018 | Mandyam et al. | |

OTHER PUBLICATIONS

"Using middleware," Express, printed: Jan. 21, 2019, 6 pages, https://expressjs.com/en/guide/using-middleware.html.

"Type-Safe Sessions," Kitura Guides, Printed: Feb. 1, 2019, 6 pages. https://www.kitura.io/guides/middleware/typesafesessions.html.

Lees, A., "A new kind of kitura middleware: type-safe and easy to use," IBM Developer, Jun. 5, 2018 (Updated Jun. 7, 2018), 8 pages. https://developer.ibm.com/swift/2018/06/05/type-safe-middleware/.

* cited by examiner

MIDDLEWARE IN WEB FRAMEWORK

BACKGROUND

The present disclosure relates generally to web framework development, and more particularly to a method for middleware in a web framework.

The present disclosure also relates to a computer program product comprising computer-readable program code that enables a processor of a system to implement such a method.

The present disclosure further relates to a system for middleware in a web framework.

Current web frameworks can include the concept of middleware; functions that can be registered against routes in an application. These middleware functions are able to execute code, alter request and/or response objects, and end a request-response cycle. Once a function of the middleware is completed, the middleware typically calls a route handler function. The route handler function, which can be another middleware, receives the altered request and/or response object as an input from the middleware.

Third parties can implement custom middleware to add functionality, such as authentication and sessions, to their applications.

These types of third-party middleware lack type and compile-time safety. For example, they may implement generic data types, and the compiler is unable to confirm whether a route handler that wants authentication or sessions has had a corresponding middleware registered against the same route. As a result, the compiler is unable to confirm whether the middleware was successfully run, or was run at all (since the compiler is unable to determine whether the request and/or response object has been altered). Thus, the compiler is unable to determine the validity of the code.

Additional functions can be added to an application to check whether the request and/or response objects have been altered. However, this increases the amount of code in the application, reducing its overall efficiency.

SUMMARY

The present disclosure seeks to provide a computer-implemented method for middleware in a web framework.

The present disclosure further seeks to provide a computer program product including computer program code for implementing a proposed method when executed by a processing unit.

The present disclosure also seeks to provide a processing system adapted to execute this computer program code.

The present disclosure also seeks to provide a system for middleware in a web framework.

According to an aspect of the present disclosure, there is provided a computer-implemented method for middleware in a web framework. The method comprises defining a target object type configured to hold results of a middleware function. The method further comprises receiving a first object for an application and performing a process of the middleware function using the first object to generate a process result. Based on the process result, the method then comprises generating a second object of the target object type and providing the second object to the application.

According to another aspect of the disclosure, there is provided a computer program product for middleware in a web framework. The computer program product comprises a computer readable storage medium having program instructions embodied therewith, the program instructions executable by a processing unit to cause the processing unit to perform a method according to a proposed embodiment.

According to another aspect of the disclosure, there is provided a processing system comprising at least one processor and the computer program product according to an embodiment. The at least one processor is adapted to execute the computer program code of said computer program product.

According to yet another aspect of the disclosure, there is provided a system for middleware in a web framework. The system comprises a data processing unit configured to define a target object type adapted to hold results of a middleware function. The data processing unit is further configured to receive a first object for an application and perform a process of the middleware function using the first object to generate a process result. Based on the process result, the data processing unit is further configured to generate a second object of the target object type and provide the second object to the application.

BRIEF DESCRIPTION OF THE DRAWINGS

Preferred embodiments of the present disclosure will now be described, by way of example only, with reference to the following drawings, in which.

DETAILED DESCRIPTION

Figure 1:
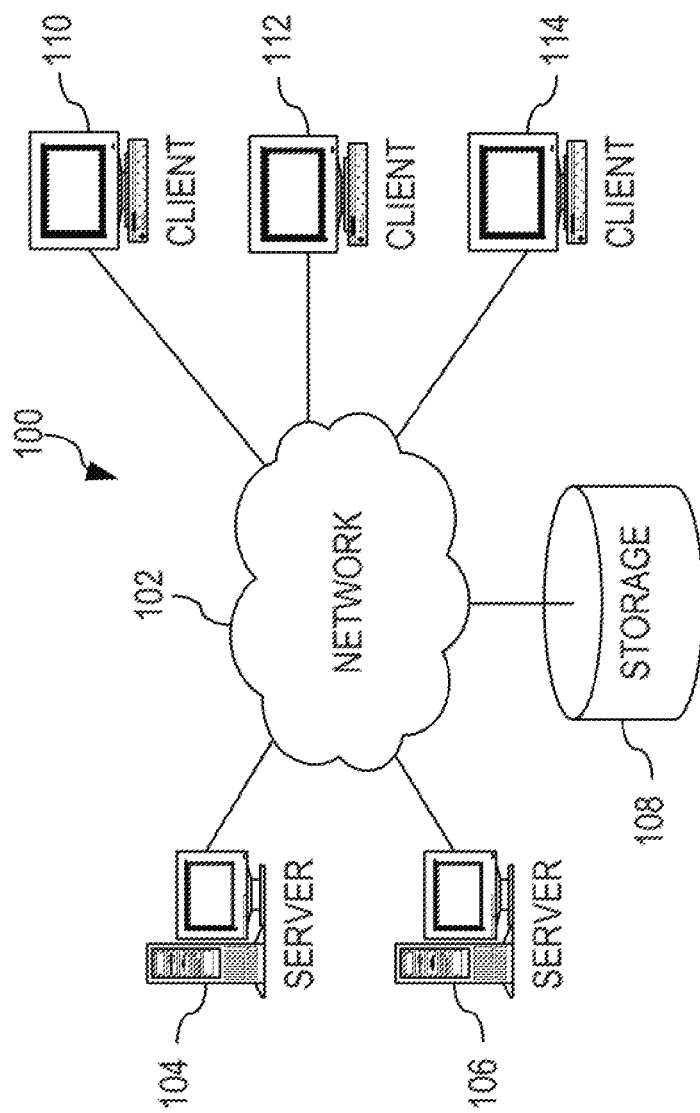
FIG. 1 depicts a pictorial representation of an example distributed system in which aspects of the illustrative embodiments may be implemented.

It should be understood that the FIG.s are merely schematic and are not drawn to scale. It should also be understood that the same reference numerals are used throughout the FIG.s to indicate the same or similar parts.

In the context of the present application, where embodiments of the present disclosure constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

An implementation of middleware in a web framework is proposed. Such an implementation may be designed to act as a safety net to prevent harmful data disclosure. Accordingly, embodiments may be implemented in conjunction with personal healthcare information.

The inventors propose improvement of middleware implementation in a web framework, in order to increase the compile time safety and efficiency of the middleware.

By way of example, embodiments may be implemented in conjunction with Codable Routing. The route handler functions in Codable Routing take value (e.g. struct) or reference (e.g. class) types as parameters, and respond with value or reference types using a completion handler. A requirement of Codable Routing is that these types implement Codable from Swift 4.

Embodiments may further be implemented in conjunction with a 'strong' type system found in many modern programming languages.

In computer programming, programming languages are often colloquially classified as to whether the language's type system makes it 'strongly typed or 'weakly typed' (i.e. loosely typed). Generally, a strongly typed language has stricter typing rules at compile time, which implies that errors and exceptions are more likely to happen during compilation. On the other hand, a weakly typed language has looser typing rules and may produce unpredictable results or may perform implicit type conversion at runtime.

Thus, in a strongly typed language, each data area will have a distinct type and each process will state its communication requirements in terms of these types. In contrast, a weakly typed language may produce unpredictable results or may perform implicit type conversion.

Accordingly, a strong type system may refer to a system containing measures to ensure correctness and validity of code. Such measures may include stricter rules to the programming language's type system at compile time when compared with a weak type system. The rules may include methods for capturing invariants of the code and excluding certain classes of programming errors. Thus, "strong typing" generally refers to use of programming language types in order to capture invariants of the code and ensure its correctness (thereby excluding certain classes of programming errors).

A number of different language design decisions have been referred to as evidence of "strong" or "weak" typing. One of these is more accurately understood as the presence or absence of type safety.

Type safety is the extent to which a programming language discourages or prevents type errors. A type error is erroneous or undesirable program behaviour caused by a discrepancy between differing data types for the program's constants, variables, and methods (functions), e.g., treating an integer (int) as a floating-point number (float). Accordingly, type-safe code may only access the memory locations it is authorized to access.

Proposed is a concept for a method for middleware to read a first object and generate a new object, henceforth referred to as a second object, using the result of the middleware function. The generated second object is then passed on to a route handler.

A proposed embodiment for the method defines a target object type that is able to hold results of a middleware function. Instead of altering a received first object for an application after the middleware reads it, the middleware generates a second object of the target object type.

By accounting for the information produced by processing the middleware function using the received first object, the middleware function is able to define the target object type that is configured to hold the results of the middleware function.

Embodiments may thus facilitate type-safe middleware that enables validity confirmation of the executed middleware. Type-safe code cannot perform an operation on an object that is invalid for that object. This ensures that an operation is working on the correct object type specific to a scenario before the operation is executed. This may be at compile-time or at run-time.

Accordingly, proposed is a method to ensure type-safety in the parameters passed through the middleware.

A tool for defining a target object type that is able to hold results of a middleware function may therefore be provided by a proposed embodiment. Such a tool may improve compile-time safety of an application.

By way of example, a proposed embodiment may comprise defining a target object type configured to hold results of a middleware function. The proposed embodiment may also receive a first object for an application and may perform a process of the middleware function using the first object to generate a process result. Based on the process result, a second object of the target object type may be generated. Consequently, the second object may be provided to the application.

By defining a target object type able to contain any information produced by the middleware function, a type-safety of the middleware function may be enabled. The middleware may then create an instance of itself, which involves creating the second object of the defined target object type, and may return this to the next applicable piece of code. The target object type may be a template for the second object and may specify all the information that the second object contains. At compile time, a compiler may then be able to identify the second object using the target object type, and may therefore confirm the validity of the second object.

This may improve the process of locating errors in middleware, as the compiler may be able check the data accessed by route handler functions. It may also reduce the amount of code required in route handlers when compared with the implementation of traditional middleware (e.g. because there is no longer a need to check if required information exists). A requirement for type checking or dealing with middleware failure within the route handler function may thus be removed. As a result, type mismatches may be checked at compile time, enabling type-safety.

Further, embodiments of the disclosure may enable the code used in the middleware functions to be centralized, such that it is not required to be repeated when the middleware function is called. The embodiments may also remove the need to amend or augment the received first object, as any required data is part of the middleware function.

In some embodiments, the middleware function may be attached to a route in the application. The route may be a path that a user can take through an application. One or more middleware may be attached to a route. This may enable multiple middleware functions to be completed consecutively with respect to each other. Thus, an input of a middleware function may be an output of a previous middleware function along a shared route.

By way of further example, a route handler function may be attached to the route and is configured such that the second object is provided from the middleware function to the route handler function. The route handler function may be a function that is attached to a specific point on the route. If the user gets to that point, the route handler function is executed. This may enable information processed and provided by a middleware function to be passed on to a corresponding route handler. The corresponding route handler may then process the information as part of an overall function of an application.

Further, the route handler function may be a section of code that is configured to determine how to handle the second object provided by the middleware function.

This may provide a mechanism that allows route handlers to request specified object types (referred to as target object types) to be passed into the handler as parameters, and for those types to define how they are created by running authentication, creating a session, or some other task.

By doing this, an application may gain compile-time safety and developers may benefit from enhanced separation of concerns between the middleware function and the route handler function.

The first object may be at least one of a request and a response. Code at a route may receive a request and/or response object. Request and response objects may enable information relevant to a predetermined function of a system or application to pass through the system or application.

Further, the request may be a Hyper Text Transfer Protocol (HTTP) request and the response may be a HTTP response. This may enable communication between a web server and a web browser, specifically defining how an object is transmitted through a web framework. In other embodiments, the error code may be a suitable Hyper Text Transfer Protocol Secure (HTTPS) error code.

Traditional middleware provides a function which allows the middleware to manipulate the request and/or response object before the application's route handler function is invoked. Traditional middleware can only pass information to a route handler function by amending or augmenting the request and/or response objects. These objects are generic and so the route handler function needs to confirm if additional information has been added by the traditional middleware function before using it. An example of a common API design for traditional middleware, modelled on Express or Kitura 1 in Swift code, is as follows:

```
public protocol Middleware {
func handle(request: RouterRequest, response: RouterResponse, next:
( ) -> Void)
}
```

An example embodiment of the disclosure applied to the example above is as follows:

```
public protocol TypeSafeMiddleware {
static func handle(request: RouterRequest, response: RouterResponse,
completion:
(Self?) -> Void)
}
```

Rather than augmenting the request and/or response object, the exemplary method above is responsible for returning a second object of the target object type. In this example, the structure and behavior of the middleware may be centralized into a single place. Therefore, the target object type is 'Self', and may be a concrete type.

In some embodiments, the generated second object may be a concrete object. This may enable the generated second object to contain information instantiated by a middleware function, ensuring a compiler may be able to identify the second object using a target object type. This may further enable confirmation of the validity of the generated second object.

Further, some embodiments may enable the plurality of middleware function to execute independently with respect to each other. The above example displays this using an asynchronous programming model to allow multiple middleware to execute independently of each other. In some embodiments, the middleware may further execute in parallel with respect to each other.

Some embodiments may enable a plurality of middleware functions to execute sequentially with respect to each other. For instance, the above example can be adjusted to reflect this synchronous programming model as follows:

```
public protocol TypeSafeMiddleware {
static func handle(request: RouterRequest, response:
RouterResponse) -> Self?
}
```

In some embodiments, the method may further comprise consulting a route table, by means of a web framework. The method may then involve dispatching a relevant middleware function according to the route table. This may enable middleware functions to be centralized in one location, reducing the amount of code in the application and improving the efficiency of the application. Once the middleware function has completed and generated the second object of the target object type, the corresponding route handler function can be called, passing through the second object.

If the middleware function is unable to define the target object type, then the middleware function is configured to return an error to the application. This may enable improved identification of possible issues in the middleware function. The return of an error to an application may further mitigate the risk of incorrect information passing through the application. The return of an error to the application may further be triggered if the first object is not received, if the process of the middleware function is not performed, and/or if the second object of the target object type is not generated.

By way of further example, the method of returning the error to the application may involve preventing the middleware function from generating the second object and preventing the route handler function from being executed. The method may further include declaring the error using an error code. For example, the error code may be a suitable HTTP error code. In other embodiments, the error code may be a suitable HTTPS error code. The prevention of the route handler execution and identification of the error may further enable compile-time safety of the application.

The following examples are expressed in the Swift programming language using Kitura 2 routing syntax. However, the disclosure is not limited to Swift or Kitura, nor is it limited to sessions middleware.

The web framework implementing the middleware function may be a server framework. The server framework may add the middleware function shown in the above example. The server framework may then define one or more middleware conforming to the middleware function, for example:

```
public protocol TypeSafeSession: TypeSafeMiddleware, Codable {
    var sessionId: String { get }
}
```

The implementation of the 'TypeSafeSession' middleware is placed in a protocol extension for the convenience of the user. In this example, the implementation is not shown for clarity. Further, the implementation currently exists in Kitura Sessions.

The user may then define the structure of the data in their session and methods for constructing a new session or restoring an existing session, for example:

```
final class MySession: TypeSafeSession {
    let sessionId: String
    var user: User?
    init(sessionId: String) {
        self.sessionId = sessionId
    }
}
```

In this example, Swift's Codable API has been implemented for convenient serialization and deserialization for restoring existing sessions, which does not require the user to implement a restore function. The benefits of the user defining the structure of the data is that 'type-safe' access to the session data can be verified at compile time. Type-safety enables validation of the executed middleware function and its corresponding output data, as described in further detail above. The user's logic and construction of the session is now encapsulated in the type itself instead of being scattered and duplicated in each place the session is used.

Following on from the above example, the user may create a handler for a GET on the route "/account", where details about the current user from an instance of the session type are required. For example:

```
router.get("/account") { (session: MySession, respondWith: (User?, RequestError?) -> Void) -> Void in
    guard let user = session.user else {
```

-continued

```
        return respondWith(nil, notLoggedInError)
    }
    respondWith(user, nil)
}
```

Traditional middleware allows the user to access the result of the middleware on a route when the middleware has failed to register on the route or the middleware has failed. This method provides no compile time safety and the application would only fail at run-time. For the disclosure, the request may be successfully processed by the middleware before the handler is executed. Further, the user may be unable to refer to a middleware within a route handler unless it has been defined as a requirement for the handler.

The 'router.get' function described above may be implemented with the disclosure as follows:

```
public func get<T: TypeSafeMiddleware, O: Codable>(_ route: String,
userRouteHandler: (T, (O?, RequestError?) -> Void) -> Void) {
    get(route) { request, response, next in
        T.handle(request: request, response: response, completion: { result in
            guard let middlewareInstance = result else {
                return next()
            }
            ...
            userRouteHandler(middlewareInstance, resultHandler)
        })
    }
}
```

'T.handle' may be a static call to the implementation of the middleware corresponding to the user's type (In) and is expected to return an instance of itself on success. The construction of 'resultHandler' was not shown in the above example as it is not relevant to the disclosure.

The logic implemented in the above example may be extended to a further embodiment containing multiple TypeSafeMiddleware as follows:

```
public func get<T1: TypeSafeMiddleware, T1: TypeSafeMiddleware, O:
Codable>(_ route: String, userRouteHandler: (T1, T2, (O?, RequestError?) ->
Void) -> Void) {
    get(route) { request, response, next in
        T1.handle(request: request, response: response, completion: { result in
            guard let middlewareinstance1 = result else {
                return next()
            }
            T2.handle(request: request, response: response, completion: { result in
                guard let middlewareInstance2 = result else {
                    return next()
                }
                ...
                userRouteHandler(middlewareInstance1, middlewareInstance2, resultHandler)
            })
        }
    }
}
```

The above embodiment executes the middleware handlers sequentially, however a further embodiment may restructure the middleware handlers into a parallel implementation where the 'userRouteHandler' is invoked only when all middleware have successfully completed their respective functions.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
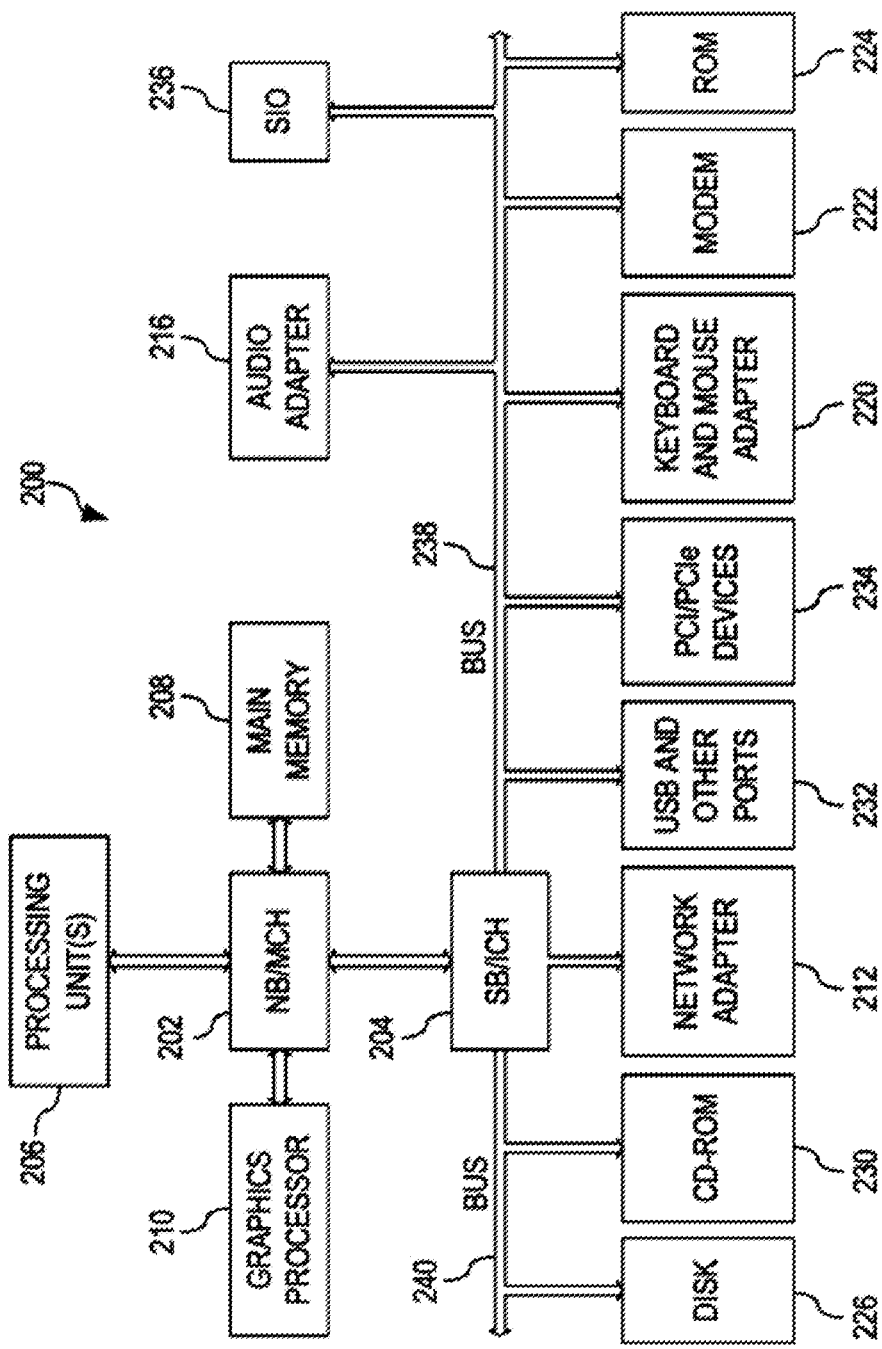
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
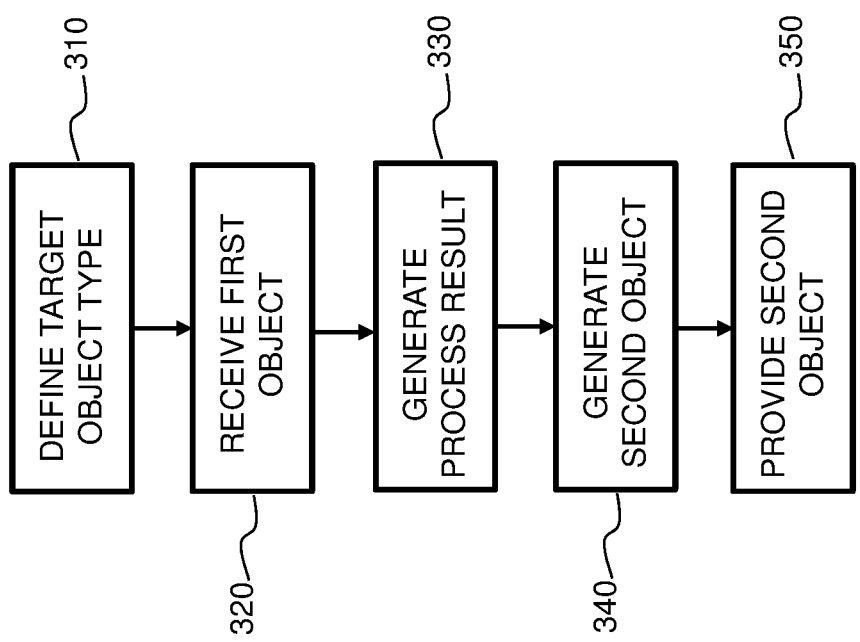
FIG. 3 is a flow diagram of a computer-implemented method for middleware in a web framework according to an embodiment.

Referring now to FIG. 3, there is depicted a flow diagram of a computer-implemented method for middleware in a web framework according to an embodiment.

Step 310 comprises defining a target object type configured to hold results of a middleware function. The target object type may be a template for the second object and may specify all the information that the second object contains. In some embodiments, the generated second object may be a concrete object.

In step 320, a first object for an application is received. The first object may be at least one of a request and a response. Code at a route may receive a request and/or response object. Further, the request may be a Hyper Text Transfer Protocol (HTTP) request and the response may be a HTTP response. In other embodiments, the error code may be a suitable HTTPS error code.

Step 330 comprises performing a process of the middleware function using the first object to generate a process result. Some embodiments may enable a plurality of middleware functions to execute sequentially with respect to each other. In further embodiments, the plurality of middleware function may be enabled to execute independently with respect to each other.

Step 340 comprises, generating a second object of the target object type based on the process result.

Finally, in step 350, the second object is provided to the application. For example, the second object may be returned to the next applicable piece of code. In some embodiments, a route handler function may be attached to the route and is configured such that the second object is provided from the middleware function to the route handler function.

Figure 4:
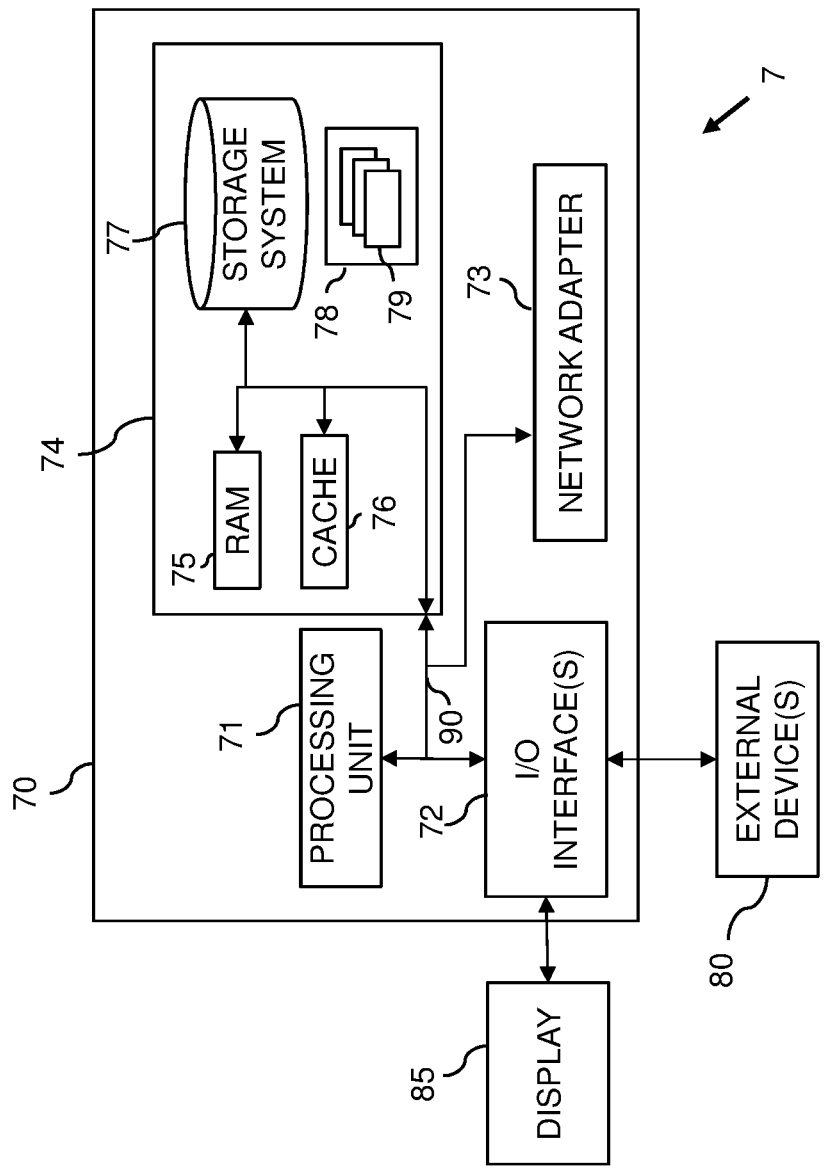
FIG. 4 is a simplified block diagram of an exemplary embodiment of a system for middleware in a web framework.

By way of further example, as illustrated in FIG. 4, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

The processing unit 71 is configured to define a target object type; the target object type is adapted to hold results of a middleware function. Further, the processing unit 71 is configured to receive a first object for an application, then perform a process of the middleware function using the first object to generate a process result. Based on the process result, the processing unit 71 is configured to generate a second object of the target object type, and provide the second object to the application.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for middleware in a web framework, the method comprising:
    defining a target object type configured to hold results of a middleware function, by accounting for information produced by processing the middleware function;
    enabling a type-safety of the middleware function;
    receiving a first object for an application;
    performing a process of the middleware function using the first object to generate a process result;
    enabling a plurality of middleware functions configured to execute sequentially to each other;
    consulting a route table in a web framework;
    dispatching a relevant middleware function according to the route table;
    based on the process result, generating by the middleware an instance of the middleware wherein the instance of the middleware includes creating a second object of the target object type, wherein the second object is not an altered version of the first object; and
    providing the second object from the middleware to a next applicable piece of code in the application;
    wherein a route handler function is attached to a route in the application and is configured to provide the second object from the middleware function to the route handler function, and to determine how to handle the second object.

2. The method of claim 1, wherein if the middleware function is unable to define the target object type, the middleware function is configured to return an error to the application.

3. The method of claim 2, wherein returning the error to the application comprises:
    preventing the middleware function from generating the second object;
    preventing the route handler function from being executed; and declaring the error using an error code.

4. The method of claim 1, wherein the second object is a concrete object.

5. The method of claim 1, wherein the first object is at least one of: a request; and a response.

6. The method of claim 5, wherein: the request is a HTTP request; and the response is a HTTP response.

7. The method of claim 1, wherein the method enables the plurality of middleware functions to execute independently with respect to each other.

8. The method of claim 1, wherein the second object is a concrete object.

9. The method of claim 1, wherein the first object is at least one of:
    a HTTP request; and
    a HTTP response.

10. A computer program product for middleware in a web framework, the computer program product comprising a computer readable storage medium having program instructions embodied therewith, the program instructions executable by a processing unit to cause the processing unit to perform a method comprising:
    defining a target object type configured to hold results of a middleware function, by accounting for information produced by processing the middleware function;
    enabling a type-safety of the middleware function;
    receiving a first object for an application;
    performing a process of the middleware function using the first object to generate a process result;
    enabling a plurality of middleware functions configured to execute sequentially to each other;
    consulting a route table in a web framework;
    dispatching a relevant middleware function according to the route table;
    based on the process result, generating by the middleware an instance of the middleware wherein the instance of the middleware includes creating a second object of the target object type wherein the second object is a concrete object and a first instance of the second object, wherein the second object is not an altered version of the first object; and
    providing the second object to a next applicable piece of code in the application;
    wherein a route handler function is attached to a route in the application and is configured to provide the second object from the middleware function to the route handler function, and to determine how to handle the second object.

11. The computer program product of claim 10 further comprising: wherein the middleware function is attached to a route in the application.

12. A system for middleware in a web framework, the system comprising
    a processor; and
    a memory in communication with the processor, the memory containing program instructions that, when executed by the processor, are configured to cause the processor to:
    define a target object type configured to hold results of a middleware function, by accounting for information produced by processing the middleware function;
    enable a type-safety of the middleware function receive a first object for an application;
    perform a process of the middleware function using the first object to generate a process result;
    enable a plurality of middleware functions configured to execute sequentially to each other;
    consult a route table in a web framework;
    dispatch a relevant middleware function according to the route table;
    based on the process result, generate by the middleware an instance of the middleware wherein the instance of the middleware includes creating a second object of the target object type, wherein the second object is not an altered version of the first object;
    provide the second object from the middleware to a next applicable piece of code in the application; and
    wherein a route handler function is attached to a route in the application and is configured to provide the second object from the middleware function to the route handler function, and to determine how to handle the second object.

* * * * *